United States Patent [19]
Wakeman

[11] Patent Number: 5,341,994
[45] Date of Patent: Aug. 30, 1994

[54] SPOKED SOLENOID ARMATURE FOR AN ELECTROMECHANICAL VALVE

[75] Inventor: Russell J. Wakeman, Newport News, Va.

[73] Assignee: Siemens Automotive L.P., Auburn Hills, Mich.

[21] Appl. No.: 99,755

[22] Filed: Jul. 30, 1993

[51] Int. Cl.⁵ .................. F02M 51/00; F16K 31/02
[52] U.S. Cl. ................ 239/585.5; 239/585.3; 251/129.15; 251/129.16
[58] Field of Search .............. 239/585.3, 585.5; 251/129.15, 129.16

[56] References Cited

U.S. PATENT DOCUMENTS

| | | | |
|---|---|---|---|
| 4,477,027 | 10/1984 | Knapp et al. | 239/585.3 |
| 4,555,060 | 11/1985 | Knapp et al. | 239/585.3 |
| 4,678,124 | 7/1987 | Hafner et al. | 239/585.3 |
| 4,800,912 | 1/1989 | Hafner et al. | 239/585.3 X |
| 4,830,286 | 5/1989 | Asslaender et al. | 239/585.3 |
| 4,848,727 | 7/1989 | Nanbu et al. | 251/129.16 |
| 5,114,077 | 5/1992 | Cerny | 239/585.3 X |
| 5,192,048 | 3/1993 | Wakeman | 239/585.3 X |
| 5,207,410 | 5/1993 | Wakeman | 251/129.15 |
| 5,236,173 | 8/1993 | Wakeman | 239/585.3 X |
| 5,238,224 | 8/1993 | Horsting | 239/585.3 X |
| 5,244,180 | 9/1993 | Wakeman et al. | 239/585.5 X |

FOREIGN PATENT DOCUMENTS

| | | | |
|---|---|---|---|
| 2507332 | 9/1976 | Fed. Rep. of Germany | 251/129.16 |
| 62359 | 4/1983 | Japan | 239/585.3 |
| 2149765 | 6/1990 | Japan | 239/585.3 |
| 498864 | 12/1981 | U.S.S.R. | 239/585.3 |
| 2108767 | 5/1983 | United Kingdom | 239/585.3 |

Primary Examiner—Andres Kashnikow
Assistant Examiner—Lesley D. Morris
Attorney, Agent, or Firm—Russel C. Wells; George L. Boller

[57] ABSTRACT

In a high pressure fuel injector 10, 56 for direct injection of fuel into an internal combustion engine, the armature 28, 54 has a hub member 70 connected by means of spokes 40, 82 to a concentric ring member 42. This construction reduces the amount of magnetic material in the armature hence reduces magnetic losses and speeds up the actuation times. Spaces between the spokes allow for the passage of fluid from one side of the armature to the other during actuation.

7 Claims, 2 Drawing Sheets

SPOKED SOLENOID ARMATURE FOR AN ELECTROMECHANICAL VALVE

FIELD OF INVENTION

This invention relates in general to solenoid operated or electromagnetically operated valves and more particularly to spoked armatures for use in such valves that inject high pressure fluids into high pressure volumes.

BACKGROUND OF INVENTION

High pressure valves such as high pressure fuel injectors for use in direct injection of fuel into internal combustion engines, have requirements for very high solenoid forces due to the fact that such valves must operate very fast. Since the valves open into high pressure volumes, they need high spring forces acting in a direction typically opposite to opening to bias the valves closed and to seal the valve. In order to work against these opposing forces, dual working gap solenoid stators and armature combinations have been used. The dual gap principle allows both gaps to provide useful force to attract the armature to the stator.

In prior art high pressure valves, the armature has been a simple flat disk design. The reasons are many, from ease of fabrication to ease of design. Such a flat disk, however, is not particularly economical about its use of magnetic material and this makes the armature excessively heavy. In addition, when the armature seats against the pole pieces, any fluid captured therebetween must be squeezed out slowing the movement of the armature. Spaced apart apertures through the disk to remove such fluid unfortunately provide a high resistance path for the fluid to take as it flows from one side of the armature to the other.

Magnetically the flat disk is subject to the circulation of eddy currents and since it has excessive magnetic material, energy dissipation in the magnetic path is costly. Structurally, the flat disk is relatively flimsy in the bending direction. With the dual gap and more particularly since the second gap is at the outer edge of the disk armature, the magnetic force in this gap has the maximum possible moment arm for bending in the cross sectional direction of the armature. When this happens, unsymmetrical magnetic gaps are created and performance of the magnetic circuit is degraded. Still other disadvantages arise since the length of the magnetic gap is also the stroke of the armature/needle in the opening and closing of the valve, the uneven magnetic gaps can have severe mechanical effects by limiting the travel of the armature and applying uneven stop forces to the armature.

In order to overcome these and other disadvantages the spoked armature of the present invention is used in an electromechanical fuel injector having a solenoid actuating system for opening and closing the valve. The solenoid frame member is cylindrical and even though it is an integral structure it has co-axially aligned inner and outer tubular members radially displaced from each other and joined together at a one end forming a closed end. A coil means is located in the volume created between the tubular members and extends substantially the full depth of the frame from the open end to the closed end. This combination of a coil means and solenoid frame member forms a stator member wherein each of the tubular members form outer and inner concentric pole piece members respectively at the open end. The coil means is sealed in the frame to reduce the deterioration of the coil by the fluid in the injector.

Axially aligned with the stator and displaced therefrom is a valve seat means. An elongated needle having a valve member at one end extends axially from the valve seat means toward the stator member. Located in the inner tubular member of the solenoid frame member is a spring to bias the elongated needle means against the valve seat. A spoked armature means is secured to the elongated needle at its end opposite the valve member. The spoked armature has a central hub and a concentric ring connected to the hub by means of a plurality of spokes. The hub is magnetically coupled to the inner concentric pole piece and the ring is magnetically coupled to the outer concentric pole piece providing dual working gaps. The spoked armature is attracted to the pole pieces when the coil means is actuated by an electrical signal to axially displace the valve member from the valve seat means thereby opening the valve.

In another embodiment, a magnetic disk is interposed the stator and the armature. The disk has a central aperture and substantially enclosing the coil means at the open end of the stator member. The disk is magnetically connected to the outer concentric pole piece member providing a magnetic path to magnetically locate the outer concentric pole piece adjacent to the inner diameter of the central aperture of the disk which is chamfered to provide a concentrated circular pole thus concentrating the working gaps.

These and other advantages of the spoked solenoid armature will become apparent in the following drawings and detailed description.

Figure 1:
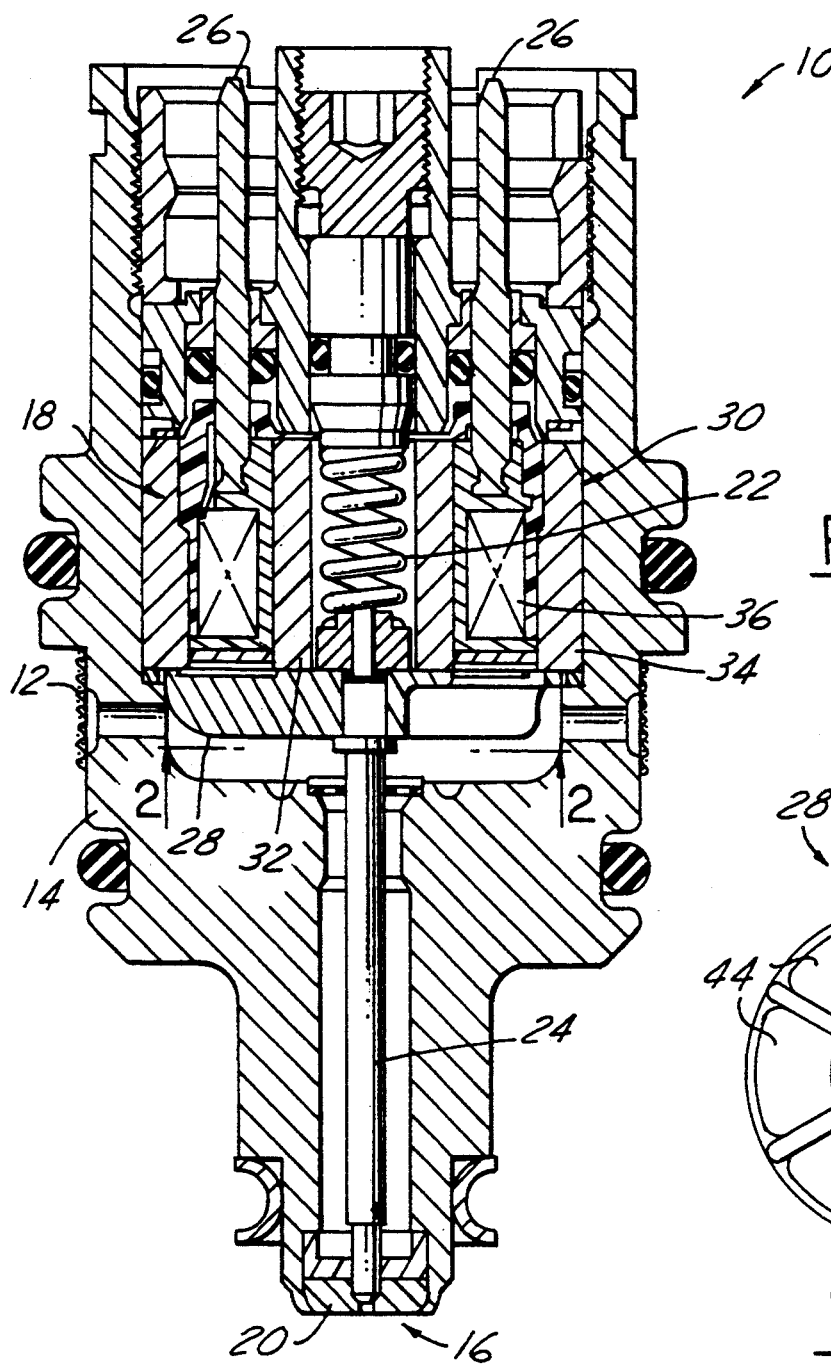
FIG. 1 is a section view along a diameter of a high pressure fuel injector having one embodiment of the spoked armature.

DETAILED DESCRIPTION:

FIG. 1, illustrates in cross-sectional view a high-pressure fuel injector 10 similar to the one described in U.S. Pat. No. 5,192,048 entitled "Fuel Injector Bearing Cartridge" issued on Mar. 9, 1993 to Russell J. Wakeman and assigned to a common assignee. However, in the '048 patent the injector shown in FIG. 1 has a large armature extending diametrically across an outer cylindrical pole piece. In addition, the armature has a hub portion which is axially longer than the outer rim to match the shorter length of the inner pole piece. Such an armature, as illustrated in '048 patent is excessively heavy due to its construction and size.

Referring to FIG. 1, there is illustrated a high pressure electromechanical fuel injector 1 0 for injecting fuel into cylinders of internal combustion engines. The injector is a side feed injector in that fuel enters through a filter 12 in the side of the injector housing 14. The fuel is injected out of a valve means 16 at one end. The injector 10 has fuel filling the inner volume from the bottom of the solenoid assembly 18 to the valve seat 20, thus the solenoid assembly is encapsulated to keep the fuel from affecting the solenoid coil. There is a bias spring 22 for adjusting the closing force of the needle valve 24 onto the valve seat 20. The solenoid assembly 18 has a pair of terminals 26 for receiving an electrical signal to provide the energy to move the spoked armature 28 and hence the needle valve 24 to actuate the injector 10 and open the valve. The solenoid frame or stator 30, in the preferred embodiment is an integral frame, having an inner tubular member 32 and an outer tubular member 34 which are joined together at one end forming a closed end. The solenoid coil 36 is located in the space between the inner 32 and outer 34 tubular members. The pole pieces, which are the tubular members 32, 34 of the stator 30, are of the same length and the spoked armature 28 according to the present invention has a circular cylindrical periphery extending diametrically across the outer tubular member 34 pole piece of the stator 30.

Figure 4:
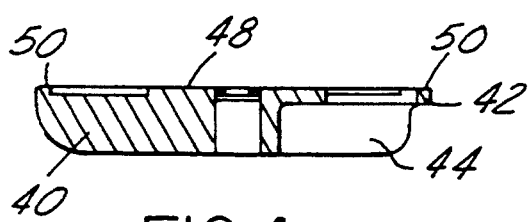
FIG. 4 is a section view taken along line 4—4 of FIG. 2.

As illustrated in FIG. 4, the spoked armature 28 has a central hub 38 which functions to be magnetically attracted to the inner tubular 32 pole piece. Extending from and supported by means of a plurality of spoke members 40 from the central hub 38 is a ring member 42 that is concentric with the hub 38. The spacing of the spoke members 40 provides a plurality of axially aligned passages 44 between adjacent spoke members 40 for the passage of fluid from one side of the armature 28 to the other as the armature moves between its normal position and its magnetically coupled position against the pole pieces 32, 34. The cross section of the spoke members 40, as illustrated in FIG. 3, has rounded leading and trailing edges 46 which reduce the resistance flow to the fluid as the armature moves.

The surface 48 of the hub 38 and the surface 50 of the concentric ring 42 are radially in line but radially displaced by means of a circumferential trough 52 across the spoke members 40. This trough 52 spans the armature surfaces to the pole pieces 32,34. In order to relieve mechanical stresses and to keep the magnetic path through the armature 28 away from local corner saturation the spoke members 40 are blended into the ring and hub in a smooth transition surface formed by substantial curved surfaces as illustrated in FIG. 3.

Figure 3:
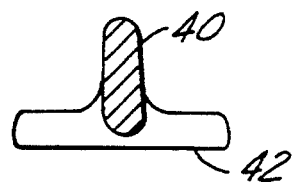
FIG. 3 is a section view taken along line 3—3 of FIG. 2.

By having the cross section of the spoked members 40 being a vertical web, as illustrated in FIG. 3, instead of a horizontal web as found in a disk, the bending forces are taken by a very deep section beam. This of course would normally give rise to torsional spring forces but in the solenoid operation there are no torsional forces formed.

Figure 5:
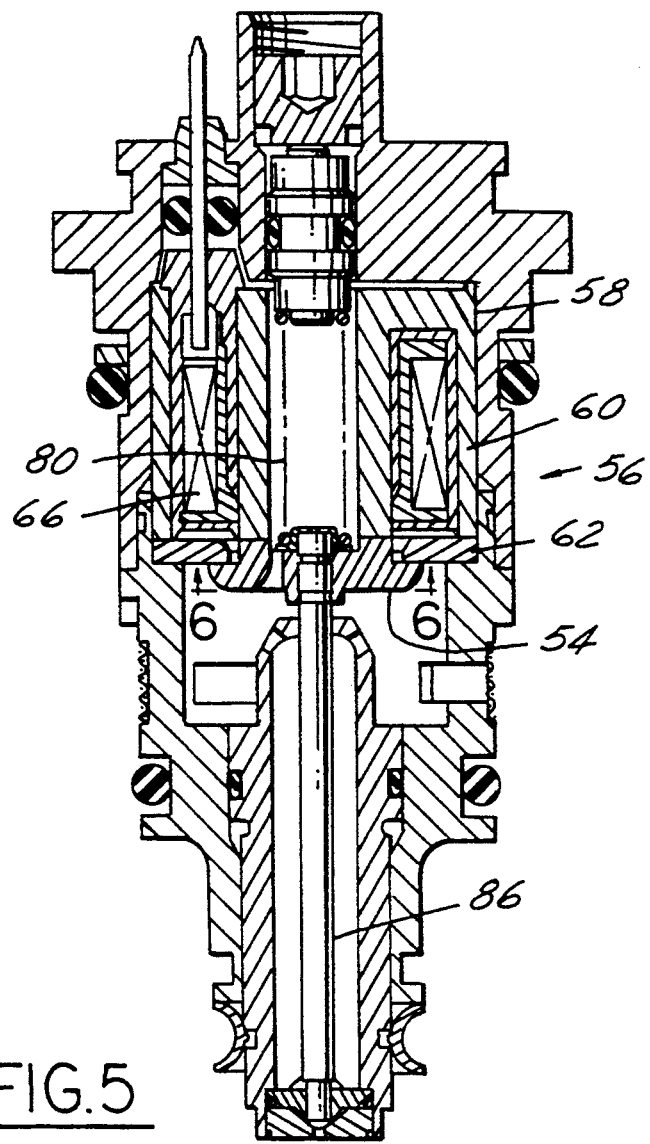
FIG. 5 is a section view along a diameter of a high pressure fuel injector having a preferred embodiment of the spoked armature.

Referring to FIG. 5, there is illustrated a preferred embodiment of an upturned spoke armature 54 in another high pressure fuel injector 56. In this embodiment, the overall outside diameter of the upturned spoke armature 54 is well within the axial projection of the solenoid coil frame 58. In this spoked armature 54, hub 70 of the armature has a diameter substantially equal to the diameter of the inner pole piece but the outside diameter of the armature does not extend across the diametrical distance of the outside pole pieces 60 as does the spoked armature 28 in FIG. 1. In order to use this structure, a magnetic disk means 62 is added between the upturned spoke armature 54 and the solenoid frame 58. The disk means 62 has a central aperture 64, which is chamfered to provide a circular pole piece around the edge of the aperture 64. The concentric ring 72 of the armature 54 has an outer diameter larger than central aperture 64 of disk means 62. The magnetic disk means 62 substantially encloses the solenoid coil 66 at e open end of the solenoid frame 58. The magnetic disk means 62 is magnetically connected to the outer concentric pole piece 60 providing a magnetic path to magnetically locate the outer concentric pole piece adjacent to the inner diameter of the central aperture 64 of the disk means 62.

Figure 7:
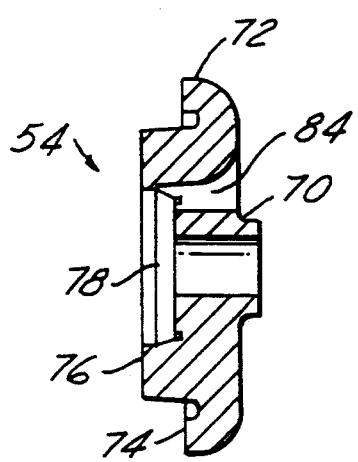
FIG. 7 is a section view taken along line 7—7 of FIG. 6.
Figure 6:
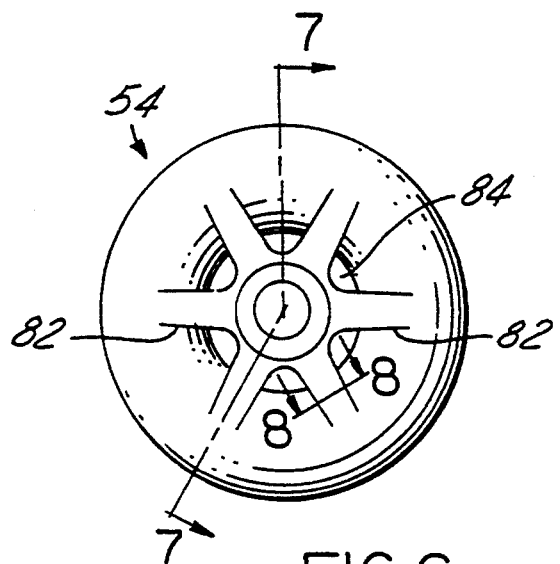
FIG. 6 is a plan view of the preferred embodiment of the spoked armature taken in the direction of line 6—6 of FIG. 5.

This magnetically locates the outer and inner pole pieces in a closer radial relationship but the axial displacement between the pole pieces is equal to the thickness 68 of the magnetic disk means 62. The axial cross section of the upturned spoke armature 54 from the hub 70 to the concentric ring is "J" shaped with the hub 70 surface axially displaced from the outer ring 72 surface. This places the two working gaps, bounded by the outer working gap armature surface 74 and the inner working gap armature surface 76 in a closer radial relationship than that illustrated both in FIG. 1 and the prior art. This is illustrated in the sectional view of FIG. 7. In the embodiment of FIG. 5, the central portion 78 of the hub provides a receptacle for the bias means or spring 80 to bias the armature 54 in its normal position.

Figure 2:
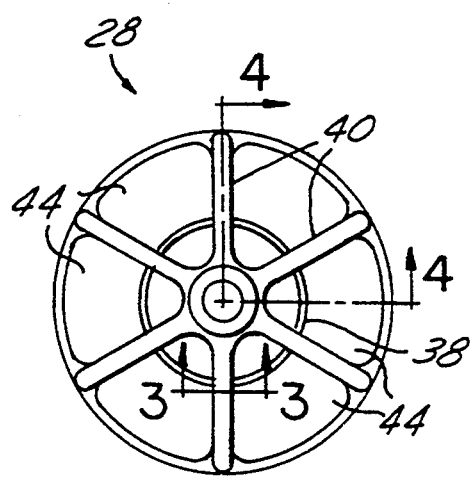
FIG. 2 is a plan view of the one embodiment of the spoked armature taken in the direction of line 2—2 of FIG. 1.
Figure 8:
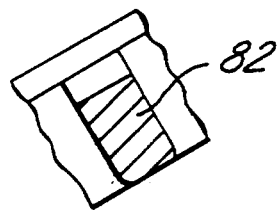
FIG. 8 is a section view taken along line 8—8 of FIG. 6.
Figure 9:
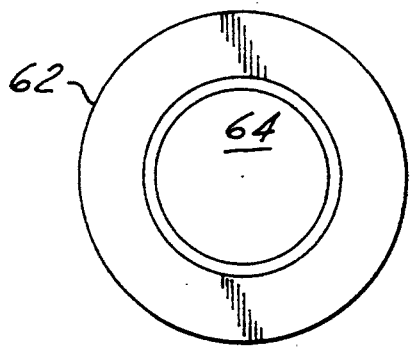
FIG. 9 is a plan view of the magnetic disk.

As with the armature of FIG. 2, the spokes 82 are blended with the hub surface 70 and concentric outer ring surface 72 by substantial curved radius to reduce or relieve mechanical stresses and to keep the magnetic path through the upturned spoke armature 54 away from local corner saturation. The spokes 82 provide axially extending passageways 84 to allow the flow of fluid from one side of the armature to the other with the least amount of flow resistance. In addition, as illustrated in FIG. 8, the leading edge of the spokes 82, as respects fluid flow, is rounded to provide better flow characteristics.

In both the armatures of FIG. 1 and 5, the projected area of the armature to fluid flow is reduced by means of the web area of the spokes being in the axial direction. This provides a very little projected area for the high fuel flow pressure forces to act. This reduction of pressure forces reduces the effects of fluid flow on the actuation times of the injector 10, 56.

It is contemplated that the spoked armatures 28, 54 can be manufactured by powder metal or metal injection molding or even by cold forging or cold heading to get the armature in a near-net shape. The resulting blank would then need only finishing of the critical dimensions after it is assembled to the needle 24, 86 to provide the necessary alignment and flatness required in a magnetic circuit.

There has thus been shown and described a spoked armature 28, 54 for use in a high pressure fuel injector valve 10, 56 to provide a fast and more reliable operation of the solenoid actuated high pressure fuel injector valve.

I claim:

1. An electromechanical fuel injector having a solenoid actuating system for opening and closing a valve having a cylindrical solenoid frame member having an inner tubular member and an outer tubular member radially displaced from each other and joined together at a one end forming a closed end; coil means located in said outer tubular member surrounding said inner tubular member and extending substantially the full depth of said frame member from the open end to the closed end forming a stator member wherein each of said tubular members form outer and inner concentric pole piece members, respectively, at said open end; a valve means; elongated needle means having a valve member at one end and extending axially from said valve seat means toward said stator; and bias means located in said inner tubular member of said solenoid member to bias said elongated needle means against said valve seat; the electromechanical fuel injector comprising: a magnetic disk means having a central aperture and substantially enclosing said coil means at said open end, said disk is connected to said outer concentric pole piece member providing a magnetic path to magnetically locate said outer concentric pole piece member adjacent to the inner diameter of said central aperture; and armature means secured to said elongated needle means at the end opposite said valve member, said armature means being a spoked member with a central hub and a concentric ring connected to said hub by means of a plurality of spokes having passageways therebetween, the axial cross section of said armature means from said hub to said ring being "J" shaped forming inner and outer working gap surfaces on said hub and said ring, respectively, with said hub surface axially displaced from said ring surface, said inner working gap surface of said hub being magnetically coupled to said inner concentric pole piece member and said outer working gap surface of said ring being magnetically coupled to said magnetically relocated outer concentric pole piece member providing dual working gaps, said armature means being magnetically attracted to said pole piece members when said coil means is actuated to axially displace said valve member from said valve seat.

2. An electromechanical fuel injector having a solenoid actuating system for opening and closing the valve according to claim 1 wherein the leading edge and the trailing edge of the cross section of said spokes connecting said ring to said hub in the axial direction are rounded.

3. An electromechanical fuel injector having a solenoid actuating system for opening and closing the valve according to claim 2 wherein a central portion of said hub additionally supports said bias means.

4. An electromechanical fuel injector having a solenoid actuating system for opening and closing the valve according to claim 1 wherein said ring of said armature means has an outer diameter larger than said central aperture of said disk and said hub has a diameter substantially equal to the diameter of said inner concentric pole member.

5. An electromechanical fuel injector having a solenoid actuating system for opening and closing the valve according to claim 1 wherein said spokes are blended into said ring in a smooth transition surface formed by a substantial curved surface.

6. An electromechanical fuel injector having a solenoid actuating system for opening and closing the valve according to claim 1 wherein said hub of said armature means has a length shorter in the axial direction than said concentric ring of said armature means.

7. An electromechanical fuel injector having a solenoid actuating system for opening and closing the valve according to claim 6 wherein said concentric ring of said armature means has an outer diameter larger than said central aperture of said disk and said hub has a diameter substantially equal to the diameter of said inner concentric pole piece member with said ring and hub surfaces radially displaced by means of circumferential trough across said spokes and said spokes are blended into said ring in a smooth transition surface formed by a substantial curved surface.

* * * * *